Nov. 24, 1931.  F. SMITH  1,833,002

ATTACHING DEVICE FOR MOTOR VEHICLE SHOCK ABSORBERS

Filed May 10, 1926

Patented Nov. 24, 1931

1,833,002

UNITED STATES PATENT OFFICE

FRANK SMITH, OF ELLAND, ENGLAND

ATTACHING DEVICE FOR MOTOR VEHICLE SHOCK-ABSORBERS

Application filed May 10, 1926, Serial No. 108,096, and in Great Britain May 19, 1925.

This invention relates to shock-absorbing devices of mechanically propelled vehicles, being particularly directed to the provision of means for connecting the shock-absorbing device to oppositely moving parts of the vehicle, and has for its object the construction and arrangement of a simple cheap and improved form of resilient bearing within the head or coupling of the supporting levers or members hinging upon pins or studs connecting the shock-absorber to the vehicle, whereby the said pins or studs are given or permitted an angular freedom of movement within the said bearing in a plurality of directions, so as to provide for side roll of the vehicle parts, and be adapted to maintain the supporting members and the friction members of the shock-absorber in their relative operating positions giving the greatest efficiency regardless of the direction or degree of movement of the parts of the vehicle to which the supporting arms or levers are attached. Also, to secure the aforesaid head or coupling upon the said bearing.

Hitherto devices having the same object have embodied what appears to be an universal joint connection, but this does not and cannot work correctly due to the fact that while one pin is maintained in a horizontal and transverse direction the other axis moves in an angular direction in line with the centre of the arms or levers, and consequently cannot function correctly for the distortion above referred to. With my device I overcome this difficulty.

My improved bearing consists essentially of a resilient bush or bushes composed of rubber, cork, or the like in connection with the head or coupling of the supporting member or members of the shock-absorber, preferably of greater length than the bore thereof. When fitting the head or coupling upon a pin or stud secured to a part or parts of the vehicle, the bush or bushes serve as a bearing therefor permitting the said stud to move angularly therein in a plurality of directions with little or no interference with the arms of the shock-absorber or the functioning thereof.

The head or coupling and the resilient bush or bushes therein may be prevented from varying their relative positions when positioned upon the aforesaid pins or studs either by distortion of the rubber or the like bush or bushes by the pins or studs, or by the shape of said bush or bushes and the bore in the head, or by the construction of the bore in the latter. The projecting ends of the resilient bush or bushes upon the head or coupling being positioned upon the pin or stud, are engaged by a fixed collar and a loose washer thereon, preferably corresponding in diameter with the diameter of the bore in the said head the washer being engaged by a nut screwing thereon.

If desired, but which form no part of my invention, I may fit a split fibre lining to said bush or bushes, with a corresponding washer adapted to engage each end thereof, or I may fit the said washers only.

By screwing up the nut upon the pin or stud, the shape of the bush or bushes is distorted, and all wear thereof is taken up thereby.

I attain these objects by the means illustrated in the accompanying drawings, in which:—

Similar letters refer to similar parts throughout the several views.

Figure 1:
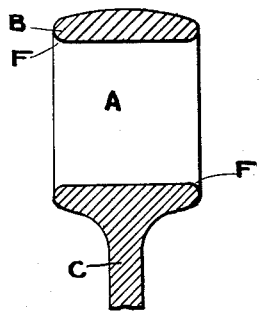
Fig. 1 shows a sectional elevation of the head or coupling of a supporting member adapted to receive a resilient bush therein according to my invention.
Figure 2:
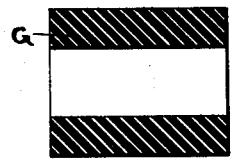
Fig. 2 is a sectional elevation of a resilient bush adapted to fit the head or coupling shown at Fig. 1.
Figure 3:
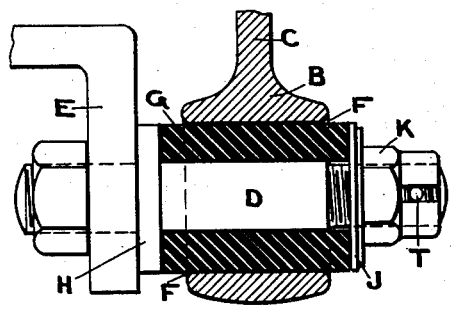
Fig. 3 is a sectional elevation of my improved bearing and means for attaching the supporting members of a shock-absorbing device to a projecting pin or stud upon one of oppositely moving parts of a motor vehicle, showing the resilient bush before any distortion thereof.

Referring to the drawings: In carrying out my invention the bore A of each head or coupling B of the supporting members C connecting the friction members of a shock-absorber with pins or studs D projecting from the chassis or the like, or the axle or the like E, or both, is flared slightly at each end at F and adapted to receive a cylindrical or other suitable bush or sleeve G composed of resilient material such as rubber or cork which loosely fits directly upon the stud D aforesaid. The bush G preferably composed of rubber is preferably of a length adapted to project a suitable distance at each side of the head B, so that when the head with its resilient bush is positioned upon D one end of said bush abuts upon or engages the shoulder of a fixed collar or the like H thereon preferably corresponding in diameter with that of the bore A, whilst the other end is engaged by a washer J also of corresponding diameter, with a nut K screwing upon this end of stud D (Figures 3, 4 and 5).

Figure 4:
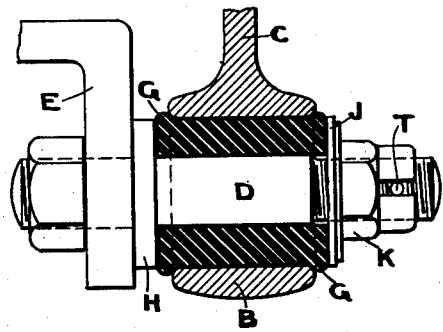
Fig. 4 is a similar view to Fig. 3 showing the distortion of the resilient bush whereby the head or coupling of a supporting member is secured thereon.
Figure 5:
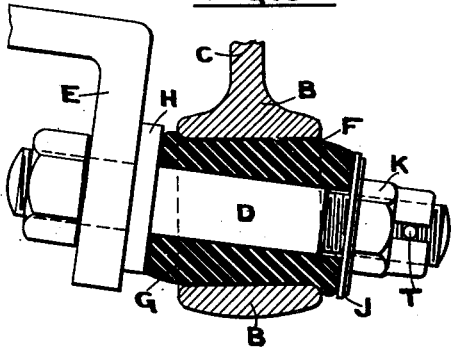
Fig. 5 is a similar view to Figs. 3 and 4, showing the relative distortion of a resilient bush or bearing within the head or coupling by an angular movement of the pin or stud therein following a side roll of the vehicle.

Upon tightening up the nut K the resilient bush G is clamped between the collar H and the washer J affecting the shape of the ends thereof which are distorted or expanded until they fill the flared ends F, forming beaded edges or flanges thereon at each side of the head B which maintain the latter in its desired position thereon, as is clearly shown at Fig. 4 of the drawings. Should parts of the vehicle be subjected to side roll the stud D moving integrally therewith is permitted a corresponding angular movement within the resilient bush G displacing parts thereof as is clearly shown at Fig. 5, without affecting the functioning of the shock-absorber or disturbing the relative operating positions of the supporting members and the friction members thereof, as aforesaid.

What I claim as my invention, and desire to secure by Letters Patent is:—

The herein described connection between members of a shock absorber and oppositely movable parts of a vehicle, comprising a sleeve carried by a member of the shock absorber, a plain cylindrical resilient bushing, extending through said sleeve and a substantial distance beyond both ends thereof, adapted to surround and engage a stud projecting from one of said vehicle parts, and a nut screwing on said stud adapted to distort said bushing into binding engagement with said stud and said sleeve when on the stud while providing for angular movement of said stud solely through internal distortion of the bushing.

In testimony whereof I have signed my name to this specification.

FRANK SMITH.